Patented May 20, 1952

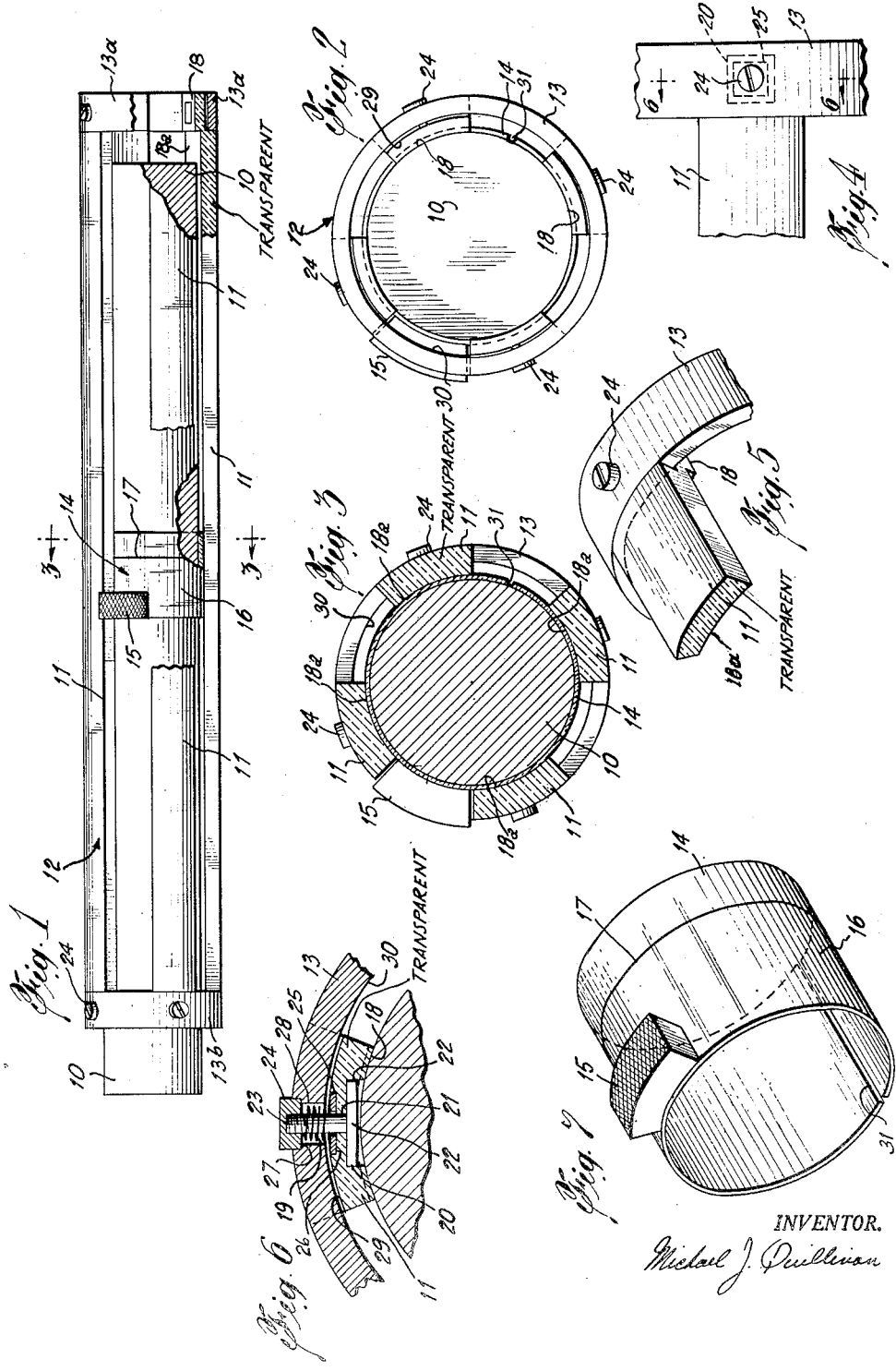

2,597,523

UNITED STATES PATENT OFFICE 2,597,523

SLIDE RULE

Michael J. Quillinan, Bronx, N. Y.

Application July 13, 1950, Serial No. 173,521

18 Claims. (Cl. 235—70)

The present invention relates to a new and improved type of slide rule in which scaled cylinders reciprocate in an efficient manner, within themselves, allowing the application of well known mathematical, logarithmic and trigonometric principles and functions to the solution of complex problems.

Since the use of such scales and graduations as would appear on this slide rule invention are common knowledge to those skilled in the art, the same are omitted from the drawings for clarity, and the specification is addressed to other phases of slide rule construction.

Previous slide rule modifications, hereinafter generally referred to as the rule, have been hampered by the effects of atmospheric conditions in that the moving scaled members do not reciprocate freely relative to the stationary scales. It has been necessary, therefore, to incorporate adjusting means in the rule's parts wherein fluctuations in humidity and temperature may be compensated for, thereby permitting greater facility in the use of the rule as well as increasing the rule's accuracy.

These means leave the adjusting of the rule to the user as the need arises. Continual manual adjustment of the rule, in addition to being inconvenient, increases the probability of inaccurate slide rule computation with improper use of the adjusting means. The above probability is further increased when untoward blows and the rigors of continued usage themselves readjust the adjusting means, necessitating further manipulation of the same.

Another critical feature of slide rule construction is the indexing means upon which is found an indexing mark. Rule accuracy requires a sensitivity of adjustment of the indexing means and its correspondingly sensitive parts. Slide rule design oftentimes leaves the indexing means vulnerable to fracture and loss of such sensitivity as a result of even normal handling.

To insure accuracy in the reading of the rule's graduations, the indexing means should remain parallel to the rule's graduations. Adhesion between surfaces, prevalent in some atmospheric conditions, causes a tilting of the index line. Rule accuracy makes it imperative that means be provided therefor to keep the indexing means in correct alignment.

In addition, slide rule structures should be rugged to withstand the complexities of adjustment brought on by rigorous use, maintain sensitivity continually and give an indication thereof when out of adjustment. Apparently, the solution to the above is to remove the need for adjusting of the rule's parts and incorporate automatic compensating means.

It remains desirable to continue such features in cylindrical slide rules where greater surface area and maneuverability of the reciprocating parts give a larger variety of slide rule uses, increased scale of the graduations and increased scale readability, speed of handling and greater flexibility in transferring the functions of one scale to another.

In a cylindrical type slide rule the outermost cylinder preferably has a substantial wall thickness thereby providing such a rugged character. The close reading of fine graduations is rendered difficult if the outer surface of the cylinder is externally graduated since parallaxity between substantially separated scales must be compensated for by the reader. Thus it becomes desirable to place these graduations on the inner surface of the outermost cylinder decreasing the distance between the cylindrical surfaces and the corresponding scales thereon. The obvious added feature of this latter type of graduation is seclusion of the graduated portions of the rule from rubbing and scuffing which impair the permanence and distinctness of the graduations.

However, it has been found difficult to economically produce such a graduation on cylindrical inner surfaces with any degree of permanence.

The instant type of rule has been invented with a view to overcome these above discussed problems in slide rule construction. It consists of a cylindrical sliding member which reciprocates within the confines of a number of cylindrically surfaced segments. The segments are braced together by cylindrical frames which are attached and circumjacent to the former. Located between the sliding member and the cylindrical surface described by the segments' graduated inner surfaces is a thin-walled indexing cylinder or runner. Both the runner and the segments are transparent and preferably made of a transparent material enabling viewability therethrough to the graduations of the sliding member. Incorporated about the frames are a plurality of compensating means which hold the segments together within the frame while permitting radial displacement of the segments allowing more fluid reciprocation of the sliding member and the runner and keeping the latter circumjacent to the graduated surfaces and coaxial with the axes thereof.

It will be appreciated that the arrangement of elements may be reversed in that the scale having the automatic adjusting and compensating means may be internal of the indexing means and the later in turn internal of the remaining scale. Thus, the automatic adjusting and securing means instead of urging radial inward pressure from one scale upon the other would, on the contrary, exert radial adjusting pressure outward from one scale to the other. Thus, a reciprocal automatic adjusting and securing function between sliding scales can be furnished without departing substantially from the spirit of the invention.

Accordingly, it is a primary object of the invention to provide a rule having scaled elements which reciprocate freely under all types of atmospheric conditions.

Another object of the invention is to provide a cylindrical rule which automatically adjusts itself to a variety of atmospheric conditions providing improved reciprocation of the scaled members.

Another object of the invention is to provide a rule the indexing means of which reciprocate freely relative to the scaled members.

Another object of the invention is to provide a cylindrical type rule with indexing means which reciprocate freely and remain in alignment with the rule's graduations despite the effect of adverse atmospheric conditions.

Another object of the invention is to provide a cylindrical slide rule the reciprocating elements of which patently exhibit rule inadjustment.

Another object of the invention is to provide rule indexing means in a rule of the type described that are sensitive, rugged and highly accurate.

Another object of the invention is to provide a rule having a high degree of sensitivity with ruggedness of character.

Another object of the invention is to provide a cylindrical rule having permanent and secluded graduating means.

Still another object of the invention is to provide a cylindrical rule of rugged construction whereon may be found graduating means that are desirably proximate to the indexing means and are economically provided.

Another object of the invention is to provide a finely accurate rule that is economical in manufacture, sturdy in construction and readily assembled.

A further object of the invention is to provide a cylinder type rule the reciprocating elements of which remain coaxial during all the complexities of usage.

A still further object of the invention is to provide a cylinder type computing means, the reciprocating elements of which move coaxially and have automatic adjusting means for maintaining said coaxial condition.

Referring now to the figures:

Fig. 1 is a longitudinal view of the rule as a unit portions thereof being broken away to show the device in greater detail.

Fig. 2 is an enlarged end view of the rule looking down the longitudinal axis thereof.

Fig. 3 is an enlarged transverse sectional view of the rule taken along line 3—3 of Fig. 1.

Fig. 4 is an enlarged fragmentary view of the rule's frame with a portion of a scaled segment attached.

Fig. 5 is a perspective view of the portions shown in Figure 4.

Fig. 6 is a still further enlarged sectional view taken along line 6—6 of Fig. 4.

Fig. 7 is an enlarged perspective view of the rule's indexing means.

The cylindrical rule modification preferably illustrated consists of a cylindrical sliding scale, generally shown as 10, and appropriately graduated. The sliding scale 10 reciprocates within a plurality of segmented strips 11 cylindrically surfaced comprising the stationary scale 12 and placed together by a frame generally shown as 13a and 13b, to which the strips 11 are secured at the ends thereof by a combination of members hereinafter referred to as securing and adjusting means. The strips 11 are of transparent plastic or composition and have their concave surfaces graduated.

The reciprocation of the sliding scale 10 relative to the fixed scale 12 is both longitudinal and rotational allowing a greater facility in the transfer of functions from scale to scale.

Indexing means generally shown as 14 also are reciprocated between the cylindrical surfaces of the fixed and sliding scales by a positioning knob 15 attached to or integrally formed with a transparent, thin-walled cylinder preferably of glass or a non-deformable resilient plastic with a circular hairline 17 placed thereon coaxially with the cylinder 16. The cylinder 16 may preferably be slit longitudinally at 31 on its periphery diametrically opposite the knob 15 as will be elaborated on hereinafter.

To maintain a coaxial relation between the sliding scale 10 and strips 11 the latter are shouldered at their ends to provide a platform 18 substantially equal in offset from the concave surface of the strip 11 to the wall thickness of the thin-walled cylinder 16.

Referring to Figs. 4 and 5, the frames 13a and 13b have holed perimeters wherein substantially contained a plurality of springs 19. Each strip 11 has provided on its concave inner sides 18a at the platform 18 a depressed polygonal seat 20 occupying a substantial depth of the platform 18. The remaining depth of the strip 11 is holed as at 21.

Resting on the seat 20 and passing through the hole 21 is a bolt flange 22 and a threaded bolt shank 23. The flange 22 meets with the seat 20. Surrounding the shank 23 is the spring 19 which is compressed between the cap 24 and a washer 25, the former being screwed on to the end of the shank 23 and the latter being seated about the shank 23 on a recessed seat 26 provided on the arched cylindrical surface 29, hereinafter described, of the strip 11.

The cap 24 rests snugly upon a ledge 27 within a substantial portion of the frame in each of the holes 28 of the frames 13a and 13b. These holes 28 and the elements deposited therein are placed about the periphery of the cylindrical frame wherever the ends of the strips 11 must necessarily be attached to the frames to form the stationary scale unit 12.

To provide a trimmed flush surface for the stationary scale 12, the strips 11 are reduced in width at the ends thereof to provide an arched cylindrical surface 29 substantially conforming to the shape of the inner face 30 of the frame 13, which steps downward from the convex face of the strip 11 and extends a substantial longitudinal distance comparable to the width of the frame 13.

In use the rule is manipulated more dexterously by reason of the securing and adjusting means. When the effects of even the slightest increments of humidity and temperature would otherwise cause a stickiness due either to expansion or contraction of the rule's components or the adhesion between humidified surfaces, this adjusting means automatically provides the required mechanical spatial change between the reciprocating scales and indices of the rule without sacrificing rule accuracy.

It will be seen that the stationary scale 12 has its component strips 11 secured to the end frames 13a and 13b between the capped and flanged ends of the shank 23. Both the cap 24 and the anchored flange 22 by the snug fit in the frames 13a and 13b and the strips 11, respectively, restrict any longitudinal or transverse displacement of the shank 23 relative either to the frame 13a and 13b or the strips 11. Furthermore, the shank 23 is rendered non-rotatable by the polygonal mating of the flange 22 in the seat 20 thereby insuring that the cap 24 will remain seated upon the ledge 27.

However, the compressed spring 19 acts through the washer 25 against the strip 11 providing for flexible radial displacement of the latter within the frame 13 when the shank distance between the cap 24 and the flange 22 allows substantial play between the face 30 of the frame 13 and the cylindrical surface 29 of the strip 11.

Thus the stationary scale 12 is of rugged construction but its scaled components flexibly and automatically satisfy the need for adjustment when the same becomes necessary. It will be noted that slight spring pressure only is required to keep the graduated concave surfaces of the strips 11 against the cylinder 16 and the sliding scale 10, and yet the strips 11 are securely fastened to the frames 13a and 13b through the shank 23. Any movement between the strips 11 and the frames 13 is necessarily radial only and is restricted to the minutest rule adjustment by the excess of the fixed shank distance between cap 24 and the flange 22 over and above the combined thicknesses of the frame 13 and the strip 11 which contain the shank 23.

When the atmosphere causes a swelling, contraction or surface adhesion between the reciprocating elements, the platform 18 resting upon the sliding scale 10 or the graduated surface of the strip 11 resting upon the cylinder 16, or both, conveniently and automatically yield with the cushioning effect of the spring 19, providing fluid manipulation of the scales and indices in both longitudinal and rotatable degree.

Moreover, since the displacement of each strip 11 is uniformly radial, the strip is moved parallel to and remains coaxial with the rule's components. The stationary scale 12 therefore, remains properly aligned with the other graduations on the sliding scale 10 and the hairline 17 of the indexing means.

The platform 18 of each strip 11 acting against the surface of the sliding scale 10 assures coaxiality of the latter with other rule components when the scales are extended to their extreme graduations. This is possible since the raised surfaces of the cylinder 16 require that the rule have at a second position a cylindrical restriction to keep the axis of the sliding scale 10 from departing from the axis of the stationary scale 12. This is accomplished by the spring pressure of the adjusting means on the strip's platform 18 substantially balancing the sliding member 10 in an axial condition circumjacent to the indexing means cylinder 16.

Such a relationship existing between the reciprocating parts gives greater slide rule accuracy in a rugged rule structure having automatic adjusting means.

By slotting the preferably glass or resilient plastic indexing cylinder 16 along its length, there results an added ease of manipulation of the indexing means when the above atmospheric effects are experienced. Slotting the cylinder lengthwise permits the indexing means to resiliently expand by changing in diameter as the sliding scale 10 reacts to changing temperature and humidity. By slotting the cylinder 16 diametrically opposite the knob 15 used to position the indexing means, twisting or spiralling of the latter is eliminated by the prevention of the possibility of any eccentric application of force which otherwise would gyrate the cylinder wall and its corresponding hairline.

The rigidity of the resilient glass or plastic further reduces the possibility of said gyrations, while the adjusting radial pressure of the strips 11 also act upon the surface of the indexing cylinder thereby maintaining its sensitivity.

It should be appreciated that by the rugged rule construction above a relatively thin-walled sensitive cylinder can be used as indexing means which cylinder is protected from fracture since the strips 11 reduce the cylinder's vulnerability from any untoward blows directed at the rule.

Cylinder wall thinness is preferable in this modification of the indexing means: namely, a longitudinally slit cylinder, for at least two reasons:

(a) A thin-walled indexing cylinder permits closer reading of the graduations and increases the reader's ability in the aligning thereof since the error due to parallax is reduced.

(b) A thin cylinder assures more sensitive response to the effects of atmospheric increments providing more readily fluid movement of the indexing means relative to the sliding scale 10.

It will be seen that slide rule economy and increased accuracy are more favorably achieved by the construction herein disclosed by providing segmented cylindrical portions as strips 11 for the stationary scale 12, and that the concave graduations thereof are more favorably and economically accomplished since a smaller and more accessible arcuate area is provided in the manufacture of the strips 11.

Finally, for further economy, simpler mechanical components for rule adjustments are provided by the construction hereinafter claimed. In overcoming the above alluded to effects of the atmosphere on slide rule accuracy, the expensive machining of metallic securing members for slide rules from the same native materials has been practiced by providing a radially automatic adjusting and securing means. In view of the above the need for such practiced art is eliminated.

Thus I have separately accomplished the objects of my invention realizing the applicability of such features of construction and arrangement of elements each to themselves and otherwise, and therefore, do not wish to be limited in breadth or scope to the modifications preferred herein but rather desire the invention to be practiced in a broader sense.

Having fully described the invention, what I claim is:

1. In a rule of the character described, cylindrical sliding and stationary scales, said sliding scale reciprocating within and circumjacent to said stationary scale, said sliding scale comprising a graduated cylinder, said stationary scale consisting of a plurality of strips braced together about said sliding scale circumjacent thereto, indexing means reciprocating between and circumjacent to said scales, adjusting and securing means provided on said stationary scale securing said strips together to form said stationary scale, said means maintaining said strips around and circumjacent to said indexing means.

2. In a rule of the character described, cylindrical sliding and stationary scales, said sliding scale reciprocating within and circumjacent to said stationary scale, said stationary scale comprising a plurality of graduated strips braced together by cylindrical frames about said sliding scale and circumjacent thereto, indexing means reciprocating between and circumjacent to the graduations of said scales, positioning means provided on said indexing means, adjusting and securing means provided on said stationary scale in said frames and said strips, said means maintaining said stationary scale around and circumjacent to said indexing means, said means radially adjusting said strips coaxially with said sliding scale and said indexing means.

3. In a rule of the character described, cylindrical sliding and stationary scales said sliding scale reciprocating within and circumjacent to said stationary scale, said stationary scale comprising a plurality of viewable segmented cylindrical strips braced together by cylindrical frames at the ends thereof and fastened thereto by automatic adjusting and securing means, cylindrical indexing means reciprocating between the concave surfaces of said strips and said sliding member, positioning means provided upon said indexing means, said automatic adjusting and compensating means governing radial displacement of said strips against said sliding scale and said indexing means, said means maintaining said stationary scale coaxially with said indexing means and said sliding scale.

4. In a rule of the character described, cylindrical sliding and stationary scales, said sliding scale reciprocating within and circumjacent to said stationary scale, said sliding scale comprising a graduated cylinder, said stationary scale comprising a plurality of transparent segmented cylindrical strips, the concave side of said strips being graduated, indexing means comprising a sensitive transparent resilient cylinder with positioning means and a hairline provided thereon, automatic adjusting and securing means provided on said stationary scale, said adjusting and securing means consisting of frames for maintaining said strips about said sliding scale and said indexing means circumjacent thereto and coaxial therewith, said adjusting means automatically providing for limited radial displacement of said strips coaxially with said rule's axis.

5. In a rule of the character described, cylindrical sliding and stationary expanding scales, said sliding scale reciprocating within and circumjacent to said stationary scale, said sliding scale comprising a graduated cylinder, said stationary scale comprising a plurality of transparent segmented cylindrical strips, graduations impressed on the concave side of said strips, indexing means consisting of a transparent resilient thin-walled cylinder with positioning means and a hairline provided thereon, said cylinder slit longitudnally along its length, automatic adjusting and securing means comprising frames for securing said strips at the ends thereof about said sliding scale and indexing means circumjacent thereto and coaxial therewith, said adjusting means automatically providing for limited radial displacement of said strips coaxially with said rules' axis.

6. In a rule of the character described, cylindrical graduated sliding and stationary scales, said sliding scale reciprocating within and circumjacent to said stationary scale so as to be coaxial therewith throughout the extremes of reciprocation, said stationary scale comprising a plurality of transparent segmented cylindrical strips, graduations impressed on the concave side of said strips, indexing means comprising a slit transparent resilient thin-walled cylinder with positionng means and a hairline provided thereon, said positioning means diametrically opposite the slit portion of said cylinder, platforms provided at the ends of said strips on the concave faces thereof, adjusting and securing means bracing said strips through cylindrical frames maintaining said strips at the ends thereof against said sliding scale, maintaining the graduations of said strip against said indexing means and the latter against the graduations of said sliding scale.

7. In a rule of the character described, cylindrical graduated sliding and stationary scales, said sliding scale reciprocating within and circumjacent to said stationary scale so as to be coaxial therewith throughout the extremes of reciprocation, said stationary scale comprising a plurality of transparent segmented cylindrical strips, graduations impressed on the concave side of said strips, indexing means consisting of a slit transparent resilient thin-walled cylinder with positioning means and a hairline provided thereon, said positioning means dametrically opposite the slit portion of said cylinder, platforms provided at the ends of said strips on the concave faces thereof, automatic adjusting and securing means bracing said strips through cylindrical frames maintaining said strips at the ends thereof against said sliding scale, maintaining the graduations of said strip against said indexing means and the latter against the graduations of said sliding scale, said strips being limited to radial displacement by said automatic adjusting and securing means.

8. In a rule of the character described, graduated sliding and stationary cylindrical scales, said sliding scale reciprocating within said stationary scale, indexing means provided between said scales, said stationary scale comprising cylindrical segments flexibly maintained against said sliding scale and said indexing means by automatic adjusting and securing means, said latter means comprising framing means surrounding said segments, attaching means radially connecting said framing means to said segments, springing means radially separating said segments and said framing means.

9. In a rule of the character described, graduated sliding and stationary cylindrical scales, said sliding scale reciprocating within, viewable through, and circumjacent to said stationary scale, cylindrical longitudinally slit indexing means provided between said scales, said stationary scale comprising cylindrical segments flexibly maintained against said sliding scale and said indexing means by automatic adjusting and securing means, which means consist of framing means surrounding said cylindrical segments at the ends thereof, nonrotatable attaching means radially connecting said framing means to said cylindrical segments, substantial radial play allowed therebetween, springing means radially separating each of said segments from said framing means.

10. In a rule of the character described, graduated sliding and stationary cylindrical scales, said sliding scale reciprocating within and circumjacent to said stationary scale, sensitive transparent indexing means provided between said scales, said stationary scale comprising cylindrical transparent segments flexibly maintained against said sliding scale and said indexing means by automatic adjusting and securing means, which means comprising cylindrical framing means surrounding said segments at the ends thereof, attaching means snugly and nonrotatably seated in and connecting said framing means and said cylindrical segments, substantial radial play allowed therebetween, springing means surrounding said attaching means and separating each of said segments from said framing means.

11. In a rule of the character described, sliding and stationary cylindrical scales, said sliding scales reciprocating longitudinally and rotatably within, and circumjacent to said stationary scale, sensitive indexing means reciprocating longitudinally between said scales, said stationary scale comprising a plurality of cylindrical strips maintained against said sliding scale by automatic adjusting and securing means, which means comprising cylindrical frames surrounding said strips at the end thereof, attaching means snugly and polygonally seated within the platformed concave ends of said strips, passing therethrough and loosely connected to said cylindrical frames by a cap screwed to said attaching means within said frames, springing means surrounding said attaching means substantially within said frame, said springing means compressed between said cap and said strip.

12. In a device of the character described, cylindrical sliding and expandable stationary scales, said sliding scale reciprocating longitudinally and rotatably relative to said stationary scale, indexing means provided between the cylindrical scaled surfaces of said reciprocating scales and reciprocating therebetween, a knob portion on said indexing means extending radially therefrom, the sides of said knob engaging the sides of said expandable stationary scale.

13. In a device of the character described, cylindrical sliding and stationary scales and a cylindrical index disposed therebetween, said stationary scale expandable on said sliding scale and rotatable therewith, said index expandable on said sliding scale, said stationary scale and said index having slits provided therealong, a positioning knob on said index engaging the sides of said slits and diametrically opposite the slit on said index, said index resiliently registering with the calibrated sides of said scale, automatic adjusting and securing means between said scales and index being provided thereby.

14. In a rule of the character described, cylindrical sliding and stationary scales, said sliding scale reciprocating within and circumjacent to said stationary scale, said sliding scale comprising a graduated cylinder, said stationary scale comprising a plurality of strips placed together about said sliding scale circumjacent thereto, indexing means reciprocating between and circumjacent to said scales with automatic adjusting and securing means provided on said stationary scale securing said strips together to form said stationary scale, said means maintaining said strips resiliently around and circumjacent to said indexing means.

15. In a rule of the character described, cylindrical sliding and stationary scales in combination with expandable indexing means, said sliding scale reciprocating within and circumjacent to said stationary scale, said sliding scale comprising a graduated-cylinder, said stationary scale comprising a plurality of strips placed together about said sliding scale and circumjacent thereto, said indexing means comprising a slit cylinder reciprocating between and circumjacent to said scales, automatic adjusting and securing means provided on said stationary scale securing said strips together to form said stationary scale, said means maintaining said strips resiliently around and circumjacent to said indexing means.

16. In a rule of the character described, cylindrical sliding and stationary scales, said sliding scale reciprocating within and circumjacent to said stationary scale, said stationary scale comprising a plurality of graduated strips placed together by cylindrical frames about said sliding scale and circumjacent thereto, indexing means reciprocating between and circumjacent to the graduations of said scales, positioning means provided on said indexing means, automatic adjusting and securing means provided on said stationary scales in said frames and said strips, said means maintaining said stationary scale around and circumjacent to said indexing means, said means radially adjusting said strips co-axially with said sliding scale and said indexing means.

17. In a rule of the character described, cylindrical graduated sliding and stationary scales, said sliding scale reciprocating within and circumjacent with said stationary scale so as to be coaxial therewith throughout the extremes of reciprocation, said stationary scale comprising a plurality of transparent segmented cylindrical strips, graduations impressed on the concave side of said strips, indexing means consisting of a slit, transparent, resilient, thin-walled cylinder with positioning means and a hairline provided thereon of said positioning means diametrically opposite the slit portion of said cylinders, platforms provided at the ends of said strips at the concave sides thereof, automatic adjusting and securing means placing said strips through cylindrical frames maintaining said strips at the ends thereof against said sliding scale maintaining the graduations of said strips against said indexing means and the latter against the graduations of said sliding scale.

18. In a rule of the character described, sliding and stationary scales acting in combination, said sliding scale reciprocating within said stationary scale, said stationary scale comprising a plurality of graduated strips braced together by frames at the ends thereof, and fastened thereto by automatic adjusting and compensating means, indexing means circumjacent said stationary and sliding scales, said automatic adjusting and compensating means governing the radial displacement of said strips against said sliding scale and said indexing means, said automatic adjusting and compensating means maintaining said stationary scale in coaxial relation with said indexing means and said sliding scale.

MICHAEL J. QUILLINAN.

REFERENCES CITED

The following references are of record in the file of this patent:

UNITED STATES PATENTS

| Number | Name | Date |
|---|---|---|
| 249,117 | Thacher | Nov. 1, 1881 |
| 513,172 | Billeter | Jan. 23, 1894 |
| 922,465 | Fenn | May 25, 1909 |
| 1,041,204 | Van Resselaer et al. | Oct. 15, 1912 |
| 2,403,382 | Lerner | July 2, 1946 |
| 2,511,270 | Kahan | June 13, 1950 |

FOREIGN PATENTS

| Number | Country | Date |
|---|---|---|
| 320,058 | France | Aug. 8, 1902 |